(12) United States Patent
Hoover et al.

(10) Patent No.: US 12,423,623 B2
(45) Date of Patent: *Sep. 23, 2025

(54) SYSTEMS AND METHODS FOR USING A PREDICTIVE ENGINE TO PREDICT FAILURES IN MACHINE-LEARNING TRAINED SYSTEMS FOR DISPLAY VIA GRAPHICAL USER INTERFACE

(71) Applicant: Capital One Services, LLC, McLean, VA (US)

(72) Inventors: Jason Hoover, Grapevine, TX (US); Micah Price, Plano, TX (US); Stephen Wylie, Carrollton, TX (US); Qiaochu Tang, Frisco, TX (US); Geoffrey Dagley, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,609

(22) Filed: Apr. 30, 2024

(65) Prior Publication Data

US 2024/0281715 A1  Aug. 22, 2024

Related U.S. Application Data

(63) Continuation of application No. 16/659,960, filed on Oct. 22, 2019, now Pat. No. 12,001,927.

(51) Int. Cl.
*G06Q 50/18* (2012.01)
*G06N 5/04* (2023.01)
*G06N 20/00* (2019.01)

(52) U.S. Cl.
CPC .............. *G06N 20/00* (2019.01); *G06N 5/04* (2013.01); *G06Q 50/188* (2013.01)

(58) Field of Classification Search
CPC ........ G06N 20/00; G06N 5/04; G06Q 50/188; G06Q 2220/00; G06Q 40/02; G06Q 40/12;
(Continued)

(56) References Cited

U.S. PATENT DOCUMENTS

| 7,693,782 B1 | 4/2010 | Stricker et al. |
| 2014/0180810 A1 | 6/2014 | Boal |

(Continued)

FOREIGN PATENT DOCUMENTS

| IN | 2536MU2015 A | * | 8/2015 | ............. G06Q 40/00 |
| IN | 2536MUM2015 A | | 8/2015 | |

OTHER PUBLICATIONS

Shatnawi, "Real time failure prediction in online services" (Year: 2015).*
Papazoglou Web services and business transactions (Year: 2003).*

*Primary Examiner* — Sangeeta Bahl
(74) *Attorney, Agent, or Firm* — Bookoff McAndrews, PLLC (57) ABSTRACT

A computer-implemented method for using a machine-learning trained predictive engine to predict failures, comprising receiving, from a user using a graphical user interface, electronic transaction data comprising an item and candidate transaction terms, the candidate transaction terms comprising a first transaction term, the electronic transaction data being associated with a candidate transaction. The method may determine, by a machine learning predictive engine, a likelihood of success of the candidate transaction based on the electronic transaction data, and may determine, by the machine learning predictive engine, based on the first transaction term, a second transaction term that, together with the first transaction term, increases the likelihood of success of the candidate transaction above a predetermined threshold. An indication of the second transaction term and (Continued)

an indication of the likelihood of success of the candidate transaction may be displayed on the graphical user interface.

9 Claims, 7 Drawing Sheets

(58) Field of Classification Search
CPC ............. G06Q 10/06316; G06Q 10/10; G06Q 20/065; G06Q 20/16; G06Q 20/29; G06Q 20/325; G06Q 20/36; G06Q 20/3678; G06Q 20/382; G06Q 20/38215; G06Q 20/3825; G06Q 20/3827; G06Q 20/388; G06Q 20/4016; G06Q 20/407; G06Q 30/0185; G06Q 30/0201; G06Q 40/00; G06Q 40/025; G06Q 40/10; G06Q 40/123; G06Q 50/01
See application file for complete search history.

(56) References Cited

U.S. PATENT DOCUMENTS

| | | | |
|---|---|---|---|
| 2015/0348186 A1 | 12/2015 | Samteladze et al. | |
| 2017/0169445 A1* | 6/2017 | Shuken | G06Q 20/10 |
| 2017/0342205 A1* | 11/2017 | Ratner | C08G 63/08 |
| 2018/0082372 A1* | 3/2018 | Diana | G06Q 40/03 |
| 2018/0089585 A1 | 3/2018 | Rickard, Jr. et al. | |
| 2018/0096372 A1* | 4/2018 | Rickard, Jr. | G06N 5/01 |
| 2018/0314952 A1* | 11/2018 | Kurian | G06Q 10/0637 |
| 2019/0342205 A1 | 11/2019 | Ur et al. | |
| 2019/0347569 A1* | 11/2019 | Breed | G06Q 50/188 |
| 2019/0378050 A1* | 12/2019 | Edkin | G06N 20/20 |

* cited by examiner

CANDIDATE TERMS ITERATIVE EVOLUTION

FIG. 3

◀ Dashboard > Car Search > Results > VIN: 1234567890098765543

NEW SEDAN
DEALER 5 mi - METRO AREA

DEALER ADVERTISED PRICE ⓘ — 405
$19,291
♡
SAVED

VIEW MORE ⓘ

⛽ 23/33   ★★★★★ 4.5   SHOW ME THE [CARFAX]
💨 0

BUILD MY OFFER ⓘ

| | |
|---|---|
| MONTHLY PAYMENT | $410 — 410 |
| APR | 4.50% — 415 |
| TERM LENGTH | [60 MOS ▼] — 420 |
| MY ASKING PRICE ⓘ | [$19,291] — 425 |
| DOWN PAYMENT ⓘ | [$0] — 430 |
| TRADE-IN ⓘ | ADD — 435 |
| SERVICE CONTRACT & GAP ⓘ | ADD — 440 |
| EST. TAX, TITLE, LICENSE ⓘ | [$1,709] — 445 |
| FEE AND OTHER ⓘ | ADD — 450 |
| AMOUNT FINANCED ⓘ | $21,000 — 455 |

[ SAVE & VIEW SUMMARY ]

SYSTEMS AND METHODS FOR USING A PREDICTIVE ENGINE TO PREDICT FAILURES IN MACHINE-LEARNING TRAINED SYSTEMS FOR DISPLAY VIA GRAPHICAL USER INTERFACE

This patent application is a continuation of and claims the benefit of priority to U.S. Nonprovisional patent application Ser. No. 16/659,960, filed on Oct. 22, 2019, the entirety of which is incorporated herein by reference.

TECHNICAL FIELD

Technical Field

Various embodiments of the present disclosure relate generally to using a predictive engine to predict failures using machine learning trained systems, and relate particularly to methods and systems for predicting the likelihood of success of candidate transactions and displaying the results via a graphical user interface.

Background

Transactions may require analysis of candidate terms prior to execution. Any of the candidate terms may increase or decrease the likelihood that the transaction will ultimately occur. There is a need for automated analysis of candidate terms in order to increase the predictability of, and accelerate term determination for, transactions.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for predicting a likelihood of success of transactions. Each of the examples disclosed herein may include one or more of the features described in connection with any of the other disclosed examples.

In one example, a computer-implemented method may use a machine-learning trained predictive engine to predict failures, and may comprise receiving, from a user using a graphical user interface, electronic transaction data comprising an item and candidate transaction terms, the candidate transaction terms comprising a first transaction term, the electronic transaction data being associated with a candidate transaction. The method may determine, by a machine learning predictive engine, a likelihood of success of the candidate transaction based on the electronic transaction data, and may determine, by the machine learning predictive engine, based on the first transaction term, a second transaction term that, together with the first transaction term, increases the likelihood of success of the candidate transaction above a predetermined threshold. An indication of the second transaction term and an indication of the likelihood of success of the candidate transaction may be displayed on the graphical user interface.

In one example, a computer-implemented method for using a machine-learning trained predictive engine to predict failures, comprising receiving electronic prior transaction data corresponding to a plurality of prior successful transactions and a plurality of prior unsuccessful transactions, and training a machine learning predictive engine based on the plurality of prior successful transactions and the plurality of prior unsuccessful transactions. Electronic transaction data may be received from a user via a graphical user interface, the electronic transaction data being associated with the user, an item, and candidate transaction terms, the electronic transaction data being associated with a candidate transaction. The machine learning predictive engine may determine a likelihood of success of the candidate transaction based on the electronic transaction data, and may determine whether the likelihood of success is below a predetermined threshold. In response to determining that the likelihood of success is below a predetermined threshold, one or more alternate terms of the candidate transaction that increase the likelihood of success above the predetermined threshold may be determined, and the alternate terms of the candidate transaction may be displayed on the graphical user interface.

In another example, a system for using a machine-learning trained predictive engine to predict failures, and one or more processors configured to execute the instructions to perform operations including receiving, from a user using a graphical user interface, electronic transaction data comprising an item and candidate transaction terms, the candidate transaction terms comprising a first transaction term, the electronic transaction data being associated with a candidate transaction. The operations may determine, by a machine learning predictive engine, a likelihood of success of the candidate transaction based on the electronic transaction data, and may determine, by the machine learning predictive engine, based on the first transaction term, a second transaction term that, together with the first transaction term, increases the likelihood of success of the candidate transaction above a predetermined threshold. An indication of the second transaction term and an indication of the likelihood of success of the candidate transaction may be displayed on the graphical user interface.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In general, the present disclosure provides methods and systems for using a predictive engine to forecast the outcome of candidate transactions. As will be discussed below in more detail, in methods and systems according to the present disclosure, existing techniques may be improved.

Negotiated transactions, such as for the purchase of an item, may involve one or more brokers, and one or more lenders, in addition to client (buyer/customer) and seller. These negotiated transactions may have a plurality of terms beyond merely the price of the item, such as annual percentage rate (APR), payback time period, months of payback, etc.

Since three or more parties may need to all agree on terms of the transaction, this may lead to rounds of negotiations where two of the parties agree, but an additional party declines, thus initiating another round of negotiation. This process may become protracted. For example, with the sale of an automobile, the dealer and the buyer may agree on terms, but the lender may decline due to unacceptably low APR, unacceptably long payback time period, unacceptably low down payment, etc. The lender may simply respond with a "yes" or "no," thus leaving the buyer and dealer unsure as to how to best renegotiate the terms in order to complete the transaction. Lenders may be flexible, for example, when/if the dealer and/or customer is valued (e.g., if they are high-volume), but often any deviation from an acceptable range simply results in a "no" response without explanation from the lender. This may also happen in an online environment where the client/customer may enter proposed terms e.g., via a web portal. The client may expend time and energy renegotiating terms, rebates, back-end add-ons, front-end values, trade-in values, down payment amounts, APR, and/or payback months that may be unacceptable to the dealer and/or the lender. Time may be wasted while the dealer and/or client requests approval of unfeasible terms (from the lender's or dealer's perspective) for multiple rounds of negotiation. These same problems may exist for the sale of homes, or the sale of any item where terms must be agreed upon by more than two parties.

Accordingly, a need exists to more quickly and reliably arrive at terms acceptable to all parties to a transaction.

As used herein, the term "dealer" may indicate, and may be used interchangeably with, a seller of items or services, a broker of items or services, etc. The term "client" may indicate, and may be used interchangeably with, a customer, buyer, person attempting to obtain a lease, ownership, ownership share, etc., of an item and/or service.

Figure 1:
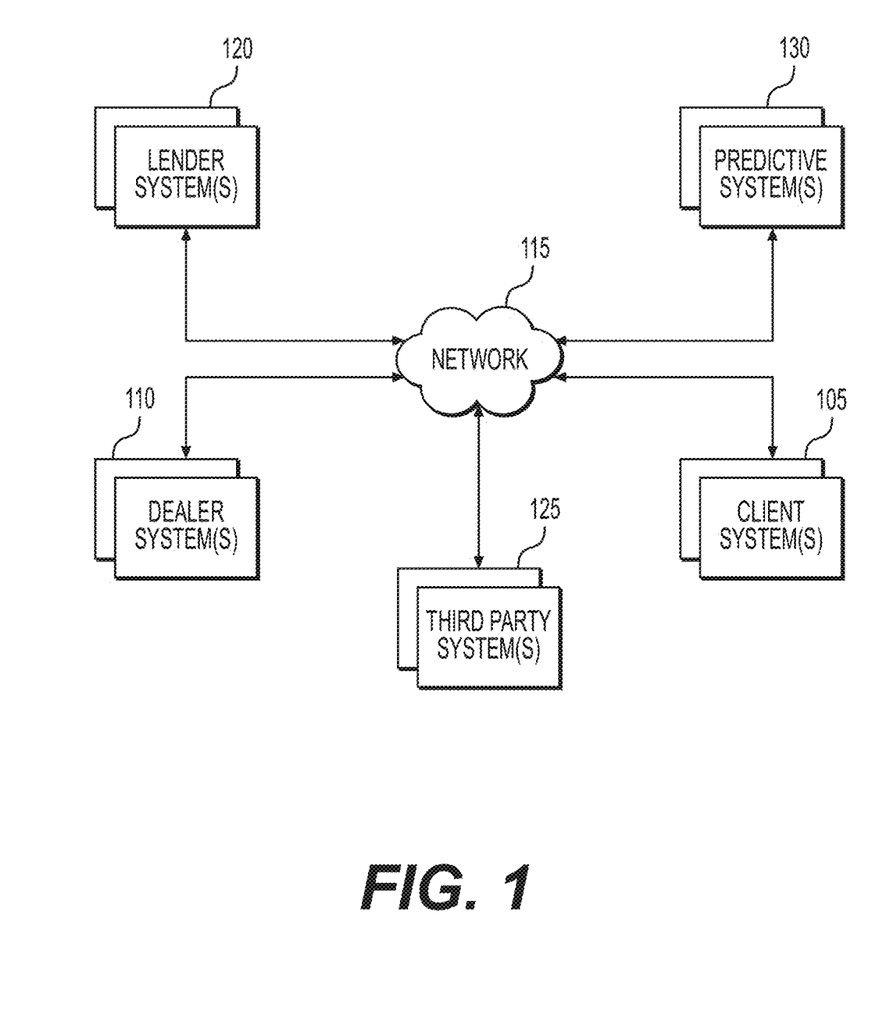
FIG. 1 depicts a client-server environment, according to one or more embodiments.

FIG. 1 depicts a client-server environment that may be utilized with techniques presented herein. One or more client system(s) 105 and/or dealer system(s) 110 may communicate across an electronic network 115 with one or more lender system(s) 120. The systems of FIG. 1 may communicate in any arrangement. For example, client system 105 may communicate with a dealer system 110 regarding candidate terms for a transaction. Dealer system 110 may then communicate with lender system 120, if necessary, to propose candidate terms for financing that the client may require. Alternatively, the client may be on site at the dealer location, and the dealer system 110 alone may communicate with the lender system 120 to propose terms of a transaction. Alternatively, the client system 105 and dealer system 110 may communicate with each other, without involving the lender system 120. The dealer system 110 and/or lender system 120 may utilize one or more third party system(s) 125 in order to acquire additional information about the client, the dealer, the lender, etc., that may be useful in deciding whether to agree to proposed terms, and/or which terms to propose, etc. For example, the lender may pull the credit score of a client after receiving proposed terms for the financing of a car from the dealer system 110 and/or client system 105.

As will be discussed herein, one or more predictive systems 130 may communicate with lender system 120, dealer system 110, and/or client system 105 to assist the lender, dealer, and/or client in deciding whether to agree to proposed terms of a transaction. The predictive system 130 may suggest new, alternate, and/or additional terms to increase the likelihood that a transaction will be acceptable, as will be discussed further herein.

While FIG. 1 depicts the various systems as physically separate and communicating across network 115, in various embodiments features of certain systems, such as the predictive system 130, may be incorporated partially or completely into any of the other systems of FIG. 1. For example, predictive system 130 may be incorporated into lender system 120. Some or all of the functionality of the predictive system 130 may be incorporated into client system 105, for example, some or all of the functionality of the predictive system 130 may be incorporated into an internet browser extension or website page usable by a user.

Figure 2:
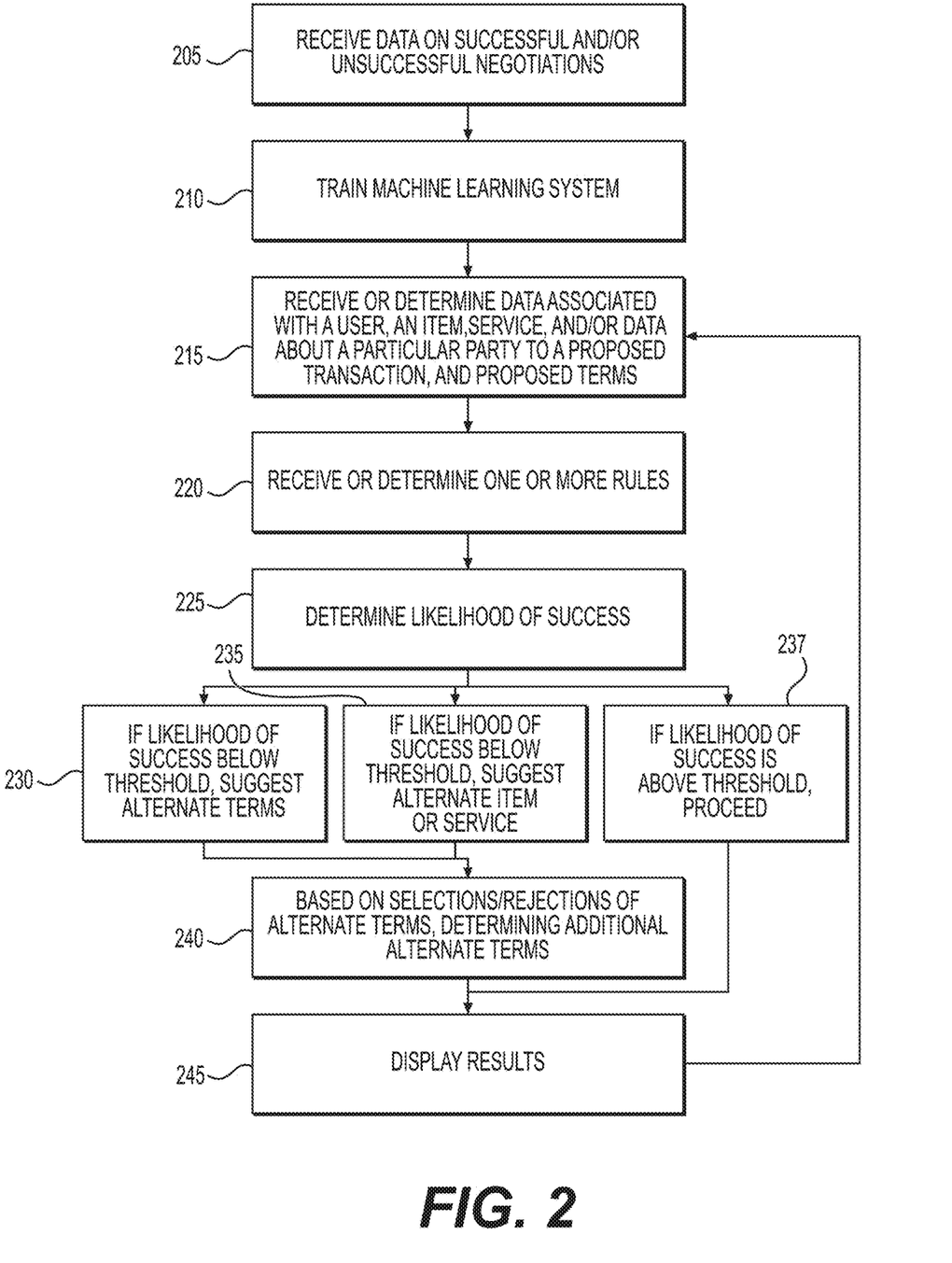
FIG. 2 illustrates a process for using a predictive engine to forecast the outcome of candidate transactions, according to one or more embodiments.

FIG. 2 illustrates a process for using a predictive engine to forecast the outcome of candidate transactions, according to one or more embodiments. At step 205, the predictive system 130 may receive data on successful and/or unsuccessful negotiations. Lenders and/or dealers often have voluminous data about the terms and/or proposed terms of transactions that may be used to train a predictive engine, e.g., predictive system 130. The data may comprise records of past proposed terms for the sale of items, proposed terms of financing, seller-specific information about sales volume, items/models sold, dealer location, seasonal variations in sales for particular items or models, trends in sales for particular items, salesperson-specific data, front-end terms of prior negotiations (front-end referring to basic sale price or amount to be financed related to the core item for sale), back-end terms of prior negotiations (add-on items or services beyond the core item for sale), down payments, trade-ins, payback time periods, proposed APRs, item type/make/model/year/condition, dealer profits on prior completed transactions, and/or lender profits on prior completed transactions, etc. The data may further comprise client/customer data such as credit scores, income, credit history, overall financial health, client demographics, client search history of online activity, home ownership status, occupation, marital/family status, etc.

Data may be obtained on proposed terms that were not accepted by one or more of the parties—i.e., deals that did not succeed. For example, data may be obtained on proposed terms from the dealer that were received by lenders for which the lender approved, but the client did not.

At step 210, the data obtained in step 205 may be used to train a machine learning system that may act as a predictive engine used by predictive system 130. The data may be dealer-specific, in order to maximize the accuracy of the predictive engine. Certain dealers may be more proficient at selling certain items, certain services, certain models, at certain times of year, times of week, etc., and this may be factored into the predictive engine. The data may also (or alternatively) be salesperson-specific. Differing salespeople may have differing negotiation strengths and weaknesses, and may sell certain items more reliably than others, any or all of which may be factored in by the predictive engine when considering a potential transaction.

Alternatively, if, for example, it is determined that there is insufficient data to train the predictive engine on a single dealer, data may be obtained from multiple dealerships that are determined to be substantially similar. For example, dealerships with similar sales volumes, inventories, geographic locations, etc., may be used as substitute for, or in combination with, data for the particular dealership utilizing the predictive engine. For example, the predictive engine may, as a rule, require data for a predetermined number of successful negotiations and a second predetermined number of unsuccessful negotiations in order to be considered fully trained. This data may be obtained from the dealership in question, but if the data provided is not available or insufficient, data may be acquired from dealerships meeting predetermined metrics of similarity until sufficient data regarding the predetermined numbers of successful and unsuccessful negotiations is obtained. As will be discussed further herein, once the predictive engine is fully trained, it may be used to predict the likelihood of success of a proposed transaction, and/or suggest alternate terms of the transaction that are likely to be successful.

The definition of "successful" prior transactions and "unsuccessful" prior transactions may vary, and may be changed by the user. For example, loans that were given in an ostensibly successful transaction may nonetheless be considered "unsuccessful" if a return-on-investment (ROI) percentage and/or value threshold is not met. The loan-to-value (LTV) ratio (the ratio of the loan to the value of the asset purchased) may also be considered. If the LTV is not above a predetermined threshold, the transaction may be deemed "unsuccessful."

The trained model may consider any of the data received from step 205. Any of the price of the item or service, the age or condition of the item, etc., may be considered. Additional derivative metrics may be determined based on the data received in step 205. For example, if data is received regarding the client's behavior on client system 105 that includes the various financing terms proposed by the client, a range in financing terms may be determined. If the client is entering a range of candidate financing or other terms beyond a predetermined range, this may indicate a higher willingness to haggle, which the predictive system may report to the dealer and/or lender. A willingness to haggle metric may be determined based on the range of terms proposed by the client, which may be considered by the predictive engine when predicting a likelihood of success of the transaction, when making terms modification suggestions, and/or when performing any of the techniques discussed herein. If the client has above a predetermined threshold for the willingness to haggle metric, the predictive engine may ultimately rate the likelihood of a successful transaction as more likely. Further, the predictive engine may urge negotiations to proceed for longer, and may suggest larger term negotiations than otherwise, if the willingness to haggle metric is above a threshold.

The predictive engine may deploy machine learning techniques, such as linear regression, logistical regression, random forest, gradient boosted machine (GBM), and/or a deep neural network. Supervised or unsupervised training may be employed. For example, unsupervised approaches may include K-means clustering. K-Nearest Neighbors may also be used, which may be supervised or unsupervised. Combinations of K-Nearest Neighbors and an unsupervised cluster technique may also be used. Any of the N variables from the data received in step 205 (or derived therefrom) may correspond to a dimension in the model. As the machine learning system is trained, negotiation terms that have been successful in the past may form clusters in N-dimensional space. When the predictive engine ultimately makes a forecast and/or recommendation, as will be discussed further below, data from the current negotiation may be fed to the machine learning system, for example, as an N-dimensional vector. Whatever clusters in the model are closest to the current terms in N-dimensional space, and the outcomes associated therewith, may determine whether the negotiation is likely to be successful, may help suggest modifications, etc.

Simpler models may be deployed in parallel for speed. For example, rather than analyze all N variables in the current negotiation, a small number of predetermined primary metrics N-X may be fed to a simplified machine learning system to quickly determine if the current negotiation is close to other successful transactions. For example, a customer credit score, annual income, candidate APR, candidate financing amount, and candidate payback period may be fed to a machine learning system trained on these variables. If the dealer and client are having difficulty reaching an agreement, for example, the full machine learning system may be employed to make more detailed recommendations.

The number of variables analyzed by the predictive engine may be limited to a predetermined number. A few direct or derived variables may be determined and used to perform techniques discussed herein. For example, a history of a particular dealer's successful deals over a predetermined period, such as the past month, may be used to create an "average dealer success rate" variable. Other variables may include "average dealership APRs in the last month," (or some other predetermined time period) and/or "average sales price on cars the customer viewed online." These variables may be provided to the predictive engine for processing, according to techniques presented herein.

Other summary statistics may be generated such as averages, or distributions of different variables like back-end, price, APR, down payment, etc. These variables could be stratified in multiple ways. For example, the average back-end for this particular band of customers, the average back-end at this dealership, and/or the average back-end for all cars of this make/model in a predetermined range of years (e.g., 2007-2011 for a 2009 model car) may be determined. Then the predictive engine may display a relationship between the deal information (e.g., the back-end) of this particular deal and the expected statistics. For example, the display may be "this back-end is above average (mean/median) for customers like you/cars like this/this dealership." The display may also be, for example, "this back-end is 20% higher than the average (mean or median)," or "this back-end is more expensive than 60% of back-ends (percentiles)."

If there is a search history for a customer, similar preferences to other customers may be used to boost a recommendation for customers like them. Feature vectors may be generated for the current and past customers, and preferences may be recommended based upon a determined similarity to past customers.

At step 215, data may be received corresponding to the current negotiation for a transaction. This may include data associated with the user (e.g., client), data about the item or service, and/or data about a particular party (e.g., a particular dealer and/or salesperson) to the proposed transaction. This data may be received at the predictive system 130, and may be provided by the lender system 120, dealer system 110, third party system 125, and/or client system 105.

At step 220 one or more rules may be determined, for example upon being received from users of the predictive engine, that may reduce the number of possible recommendations provided in later steps. For example, a rule may be set that a down payment be limited to a certain maximum amount, perhaps because the client may only have a certain amount of money. Rules may be set by a user, dealer, lender, etc., or may be set by the predictive engine automatically based on the machine learning analysis. For example, while the nearest successful terms may suggest raising the offer for purchase by $X, the predictive engine may also determine that clients generally are very likely to reject an increase in the dollar amount above a predetermined value. The predictive engine may instead suggest adding back-end items, or make other suggestions for ways to increase the odds of success of the negotiation that do not violate the rules. A lender may establish a rule to never accept terms if the APR is a predetermined value below the market rate, regardless of the other terms of the transaction. Rules may also be set for the transaction in question, or generally across all transactions.

At step 225, the predictive engine may determine, based on the predictive engine and the information provided about the current negotiation, whether the negotiation is likely to be successful. The machine learning system may consider parameters of the item or service being considered. In a car, for example, the make, model, year, mileage, etc., may all be considered. The terms of the loan being requested may be considered (amount, APR, payback months, etc.), and the client financial health may also be considered.

The machine learning system may consider a variety of factors that may not be obvious to a human when determining a likelihood of success. Particular dealerships might have particular talents, for example in selling back-end add-ons, selling sedans to less financially stable customers, and/or selling SUVs to more financially stable customers.

The predictive engine may utilize weights and thresholds, and may utilize any of the rules previously determined/received in step 220. For example, if the down payment is more than a predetermined distance or percentage off of a known successful range, or if the APR is more than a predetermined percentage off a known successful range, the predictive engine may automatically conclude that the negotiation is unlikely to be successful.

The predictive engine may consider whether the candidate terms of the current negotiation are likely to be successful by classifying the candidate terms into bands. Thus, the proposed price may be associated with a similar price band, the item may be associated with a band of similar items, the customer may be associated with a similar band of customers. The predictive engine may then make a prediction of the likelihood of success based on the various bands, rather than (or in addition to) the exact terms of the individual negotiation.

The predictive engine may provide supplemental information about the likelihood of success. For example, even if the negotiation is judged to be likely unsuccessful, the predictive engine may produce feedback such as "the deal is likely to be rejected largely due to the APR being too low, however the client has a historically high negotiation success rate-please continue to negotiate!" The willingness to haggle metric may also be considered for such suggestions. Thus, certain indicators of the client and/or dealer may cause the predictive engine to suggest continuing negotiations, or conversely express skepticism about continuing negotiations.

The predictive engine may also utilize multiple objectives, the objectives being indicated by the user and/or automatically set by the predictive engine. For example, consumer happiness may be an objective. If the predictive engine determines that the likelihood of the transaction proceeding is high, but the likelihood of the client being unhappy with the deal is also high, the predictive engine may recommend that the transaction not proceed, at least not with the current candidate terms. The objectives may be considered equally important, or may be hierarchically prioritized in relation to each other, with a higher-ranked objective being given a predetermined higher level of importance than the immediately lower-ranked objective. Alternatively, the degree of importance of one objective over another may be manually set by the user.

Optionally, at step 230, alternate terms may be suggested by the predictive engine. By predicting whether deal negotiations are likely to be successful, it is possible to augment the predictive engine to look for ways to direct the negotiation towards a successful outcome. The predictive engine may actively suggest term modifications that will increase the likelihood of success, for example that will be beneficial and acceptable to the customer. As discussed above, this may involve identifying clusters in the N-dimensional parameter space that are both successful and near to the current terms, and suggesting changes to bring the terms to more closely match the successful clusters.

The predictive engine may suggest back-end changes, such as adding an additional warranty, in the case of cars, or merely financing through the dealer. The predictive engine may also suggest front-end changes, such as increasing the offered price, decreasing the price on the trade-in, etc.

Optionally, at step 235, the predictive engine may alternatively, or in addition to the suggestion of terms changes, suggest a change to the item and/or services being subject to the transaction themselves. For example, if the predictive engine determines that a deal is, as a first threshold, unlikely, or, at a second threshold, very unlikely (any number of thresholds are possible), the predictive engine may recommend a different item with the same dealer for purchase. For example, the predictive engine may access the dealer inventory, and may suggest a car that is older, less expensive, has a minor accident records, etc., as a replacement for the car (e.g., item) under negotiation. The newly suggested item may be determined by the predictive engine to increase the odds to "successful", or may simply decrease the odds that a deal will not be reached. As another example, if the predictive engine determines that the deal is unlikely to be successful at a first threshold, the engine may recommend modifications to the proposed terms. If the predictive engine determines that the deal is unlikely to be successful at a second higher confidence threshold, the engine may recommend a different item. Alternatively, if the gap between any individual parameter and the likely successful range exceeds a predetermined amount and/or percentage, the predictive engine may recommend an alternate item. The predetermined amounts and/or percentages, as with other predetermined thresholds discussed herein, may be set as a rule by the user and/or determined by the predictive engine, for example during the machine learning process.

If the predictive engine is given access to the necessary data streams, the predictive engine may not only suggest alternate items at a particular dealer, but may suggest alternate items at other dealers. For example, if a user is searching via an internet browser on client system 105, the predictive engine may suggest similar cars (e.g., items) from multiple dealerships. The predictive engine may prioritize suggesting items that are identical, but older and/or more heavily used. For example, the predictive engine may prioritize suggestions of the same make and model of a vehicle, but an older model year, or with higher mileage, or with a minor accident on the vehicle history report, such that the value meets or is closer to the offered amount in the negotiation.

At step 237, if the likelihood of success is above a threshold, the results may automatically be displayed at step 245.

Optionally, At step 240, the predictive engine may further determine alternate terms packages that are similar, yet determined to likely be more successful. This may allow the dealer and/or client to iteratively traverse the parameter space by initially selecting a terms package that they most like among a plurality of candidate term packages. As will be discussed further in reference to FIG. 3, upon selecting a package they like best, an additional plurality of alternative packages may be determined by the predictive engine and displayed for consideration. The additional plurality of alternative packages may be determined, by the predictive engine, to be more likely or approximately as likely to succeed as the currently selected package. With techniques presented herein, the likelihood to succeed or not succeed may be presented along with a percentage likelihood, and/or a rating tier indicating a degree of likelihood.

At step 245, results may be displayed, which may include a likelihood of success of the candidate terms of the negotiation, recommended alternate terms, suggested tips to increase the likelihood of success, suggested alternate items, a plurality of suggested alternate term packages, etc. Based upon user feedback, the engine may iterate back to step 215, or one of the other steps of FIG. 2, and repeat the process.

Figure 3:
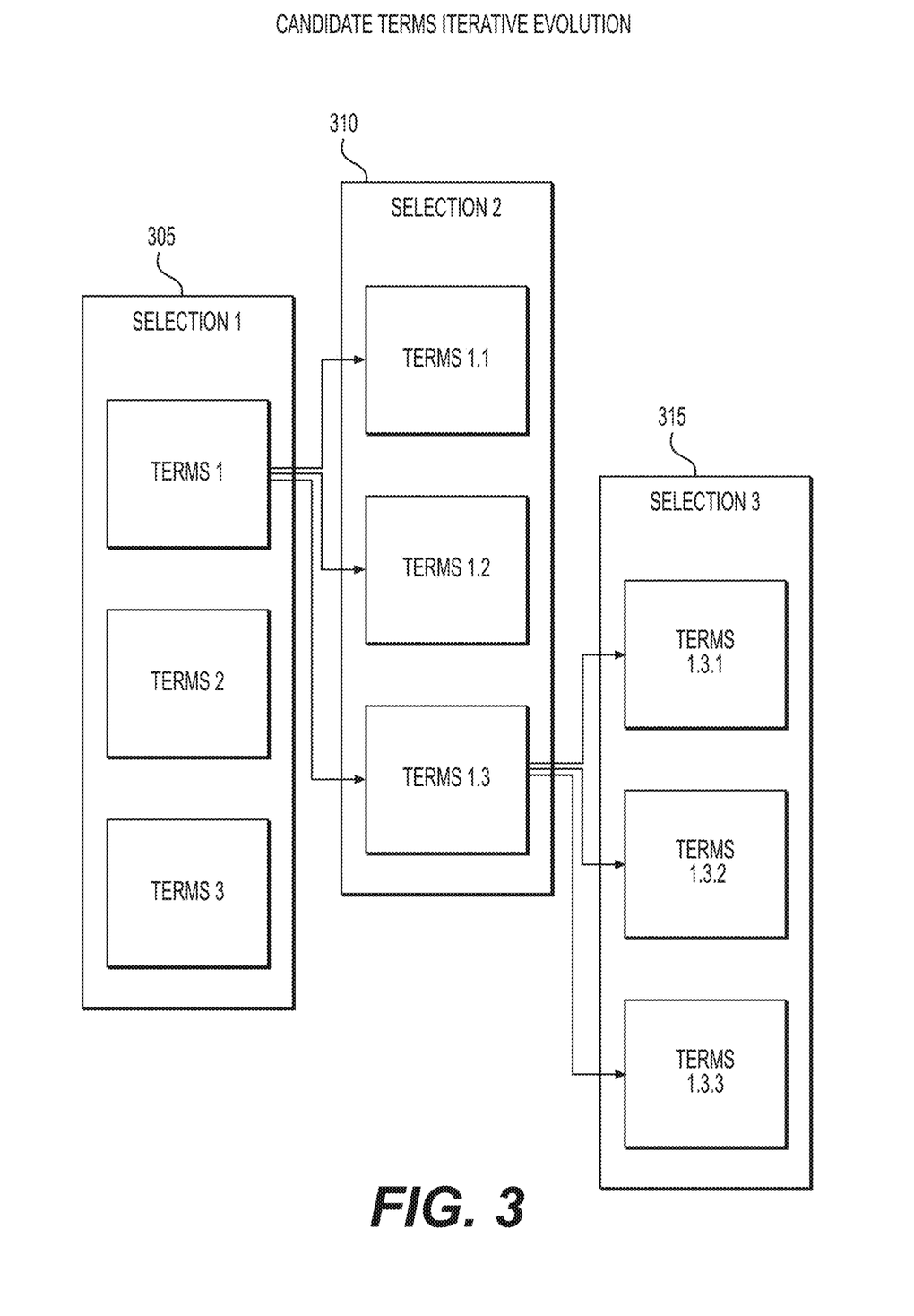
FIG. 3 illustrates a process for iteratively determining candidate terms for transactions, according to one or more embodiments.

FIG. 3 illustrates a process for iteratively determining candidate terms for transactions, according to one or more embodiments. At step 305, a user may make a first selection, which may be from a plurality of candidate terms packages, or individual terms modifications suggested by the prediction engine due to their increasing the likelihood of success of the negotiation. The user may, for example, select a first term or set of terms. Based upon that selection, at step 310 the predictive engine may determine a second plurality of term modifications, or term modification packages, to present to the user. Based upon a selection from among those, at step 315 the predictive engine may determine a third plurality of term modifications, or term modification packages, to present to the user, and so on. Each new set of candidate terms packages may be based upon the information already known about the negotiation, as well as based on the prior selections made by the user. In this manner, based upon user feedback, the predictive engine may iteratively guide the dealer and/or client to a set of terms that is highly likely to succeed, and that is amenable to all parties involved.

Figure 4:
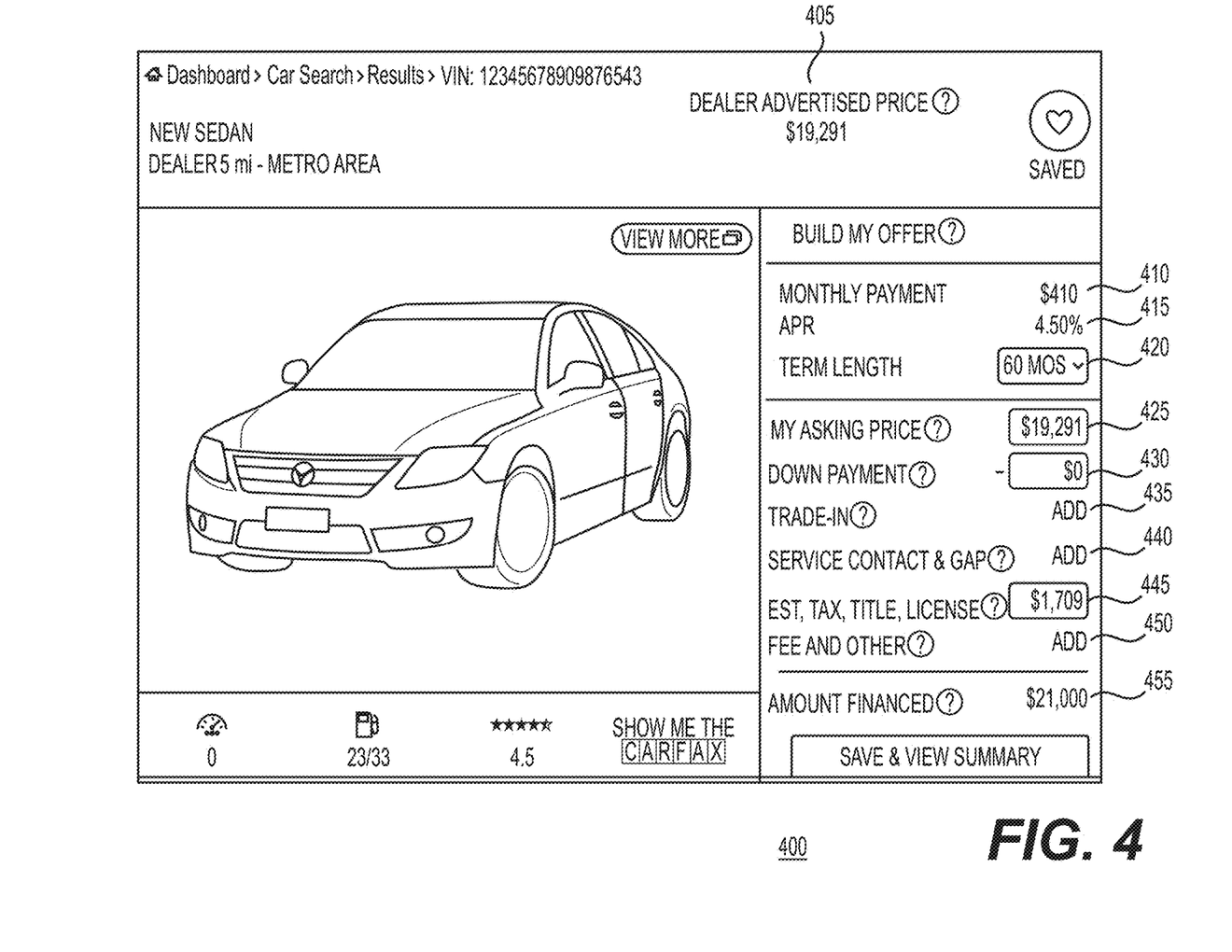
FIG. 4 illustrates a graphical user interface for forecasting the outcome of candidate transactions, according to one or more embodiments.

FIG. 4 illustrates a graphical user interface (GUI) 400 for forecasting the outcome of candidate transactions, and/or suggesting ways to increase the likelihood of success of candidate transactions, according to one or more embodiments. The GUI 400 may be displayed to the client via the client system 105, for example in an app or webpage on a client computer, cell phone, laptop, etc. The GUI 400 may also be displayed on a dealer system 110, lender system 120, etc. The user of the GUI 400 may be able to search for items such as cars, sellers such as dealerships, etc., by a search engine. Once the user has selected an item such as a car, the GUI 400 may display images and data about the car. For example, the dealer price 405 and the calculated monthly payment 410 may be displayed. The monthly payment may be calculated based on the input APR 415, loan term length 420, offered price 425, down payment offer 430, trade-in value 435, additional back-end selections such as the service contract and/or guaranteed asset protection (GAP) insurance 440, additional taxes and fees 445, and/or any other fees 450 (e.g., dealership transfer fee). Based on items 415-450, the total financed amount 455 may be determined, which may be used to determine the monthly payment 410. Alternatively, the user of GUI 400 may input a desired monthly payment 410, and the predictive engine may suggest terms in order to achieve that monthly payment, in accordance with techniques discussed elsewhere herein.

Clients using GUI 400 may repeatedly price one or more items (e.g., cars, houses, boats, or any other item) and itemize one or more of the above-listed proposed financing terms. The GUI 400 may allow for proposing candidate terms without any particular item listed, with a general type of item listed, or with a specific item listed.

One problem with the GUI approach is that users may input proposed terms that are unlikely to be approved by the other parties to the possible transaction. When users realize that dealers and/or lenders, etc., are not willing to move forward with the terms proposed by them on the GUI 400, the users may abandon the transaction. Techniques discussed herein may help educate users about the financing process and/or help the users understand what the ranges of acceptable terms are or are likely to be.

The GUI 400 may automatically populate additional terms based upon terms that the user has already entered. For example, the predictive engine may populate unfilled terms automatically, or after receiving an indication to do so by the user, by determining which terms would make the transaction more likely to be successful, as discussed elsewhere herein. For example, the user may input a proposed APR percentage, and the predictive engine may populate the term length automatically. This automatic filling of field values might only occur if the predictive engine determines that it is necessary to ensure that the negotiation retains a predetermined likelihood of success. For example, if the user inputs 2.5% as the APR 415 value, the predictive engine may determine that such a low APR would require a shorter term length 420. The predictive engine may therefore automatically populate the term length field at 36 months with an indicator explaining that any longer periods of payback would be unlikely to be approved by the dealer and/or lender. Alternatively, the predictive engine may "gray out" or otherwise make unavailable, certain values that would render the transaction unlikely to succeed beyond a predetermined threshold of confidence. For example, for a given APR percentage, certain term lengths may be grayed out as either unselectable or selectable only with a warning that such term lengths are incompatible with the selected APR, and/or are likely to make the transaction unsuccessful.

The GUI 400 may also provide indicators as to the overall likelihood of success based on the candidate terms in the form. For example, an icon, color, sound, percent, a grade rating, or other indicator may be displayed to indicate a likelihood of success of the transaction. Further, indicators may also be displayed on individual terms in the form based upon their effect on the overall likelihood of success of the transaction. For example, the candidate terms in the GUI 400 may have a color illuminating the corresponding field, or some adjacent area, as green if the particular term has a positive effect on the overall likelihood of success of the transaction, for example if the term is above a predetermined threshold, or above some threshold given the values of other candidate terms. As an example, a proposed 3.5% APR with a 48-month payback period may cause the likelihood of success of the transaction to be above a predetermined threshold, so both fields may be colored green. The individual terms may be any color, which may indicate to what degree the particular indicator is helping or hurting the overall likelihood of success of the transaction. When the user updates the value in a particular field, it may cause a reassessment and updating of the indicator displays for one or more remaining fields on the GUI 400. For example, if the term length for repayment 420 is set to 48 months, the APR field 415 may be highlighted in green or some other indicator, as the predictive engine may determine that the lender and/or dealer is likely to accept these terms. However, if the user changes the term length to 60 months, the APR 415 may be insufficiently high for the lender to approve, so the predictive engine may update the indicator, for example, from green to red. At this or at any time, if the user were to click or otherwise select the status indicator, the GUI 400 may display suggestions to increase the probability of success and/or explain the current status of the indicator. These suggestions by the predictive engine may be based on what is known about the user, what is known about users generally, and on what is known about the lenders and/or dealers, specifically and/or generally.

The predictive engine may monitor the user's usage of the GUI 400 over one or more sessions. Third party data from third party system 125 associated with the user may also be received and analyzed. This data may include not only information about the specific user, lender, and/or dealer, but also information about market lending rates, etc. All of this data may be used to continuously update the likelihood of success based upon what is known about the individual user. In addition, the predictive engine may develop weights during the training process, and may thus weigh some of the terms more heavily than others when determining the likelihood of success of a particular candidate transaction.

Additional methods of assistance from the predictive engine are possible. As discussed elsewhere herein, the GUI 400 may present multiple candidate terms packages to the user based upon the user's prior activity and/or based on non-user-specific data used during the machine-learning-training process. The user may iteratively select suggested terms packages in order to refine the candidate terms in ways the user finds most acceptable, while still likely being acceptable to the other parties to the transaction.

Further, the predictive engine may monitor the user's behavior over time, and provide a warning as to whether the user has deviated from the original inputs beyond a predetermined amount or percentage. For example, if the user begins searching for $10,000 used cars, and gradually migrates to $40,000 new cars, the GUI 400 may display a warning that the user is deviating from their originally intended purchase. The predictive engine might instead suggest items that it knows that the user is able to realistically purchase.

The range of values input may also be taken into consideration by the predictive engine when determining the range of values the user is likely to accept, and therefore which terms the predictive engine is likely to recommend in order to increase the likelihood of success. The range of items being considered may also be taken into consideration by the predictive engine, so as to shape which items the predictive engine is likely to recommend to increase the likelihood of success of the negotiation. Items above a predetermined price, or outside of a predetermined range of item ages or conditions, might simply not be shown or suggested.

If the user of the GUI 400 disregards suggestions of the predictive engine, these behaviors may be taken into account when making any further recommendations, when determining the likelihood of success, and/or when determining the willingness to negotiate.

The predictive engine might initially begin with little or no information about the user, and may instead be trained only to a generic customer. This may act as a master model, the recommendations from which are pruned based upon what is individually known about the user. The initial generic model might be somewhat customized to the band of customers that are determined to be similar to the user. The item being considered may further be placed into a band of similar items. The customer bands may be identified by administrators of the predictive engine, or may be identified by the predictive engine during the machine learning process automatically. The one or more bands may individually and/or collectively form a somewhat customized generic model that may be used by the predictive engine to determine the likelihood of success of the transaction, and for performing other techniques discussed herein.

A second model for the individual user may be constructed in addition to, or to complement, the generic model. As data about the individual user is accumulated, the second model may act to modify determinations and/or recommendations produced by the generic model. Alternatively, the data about the individual user may be used to train and modify the generic model itself. Alternatively, the data about the individual user may be used to modify the weights given to various fields on the GUI 400, and other candidate terms, when determining a likelihood of success and when performing other techniques discussed herein.

The information gathered about the user via the GUI 400 may also be provided to the dealer, lender, or any party to the candidate transaction. If the dealer, for example, intends to provide a counter-offer rather than accept the proposed terms of the user, the predictive engine may suggest terms modifications that the user is likely to accept. The suggested term modifications may be determined based on what is known generically about that type of user, what is known specifically about the user based on the user's tracked behavior via GUI 400, and/or other third party data.

The proposed terms received from the user via GUI 400 may be used to search across a plurality of dealers selling items within a predetermined degree of similarity to the individual item, or item type, selected by the user. The predictive engine may determine one or more dealers most likely to accept the proposed terms of the user. The results may be displayed to the user, and the dealer may be automatically contacted and provided information such as the proposed terms.

Figure 5:
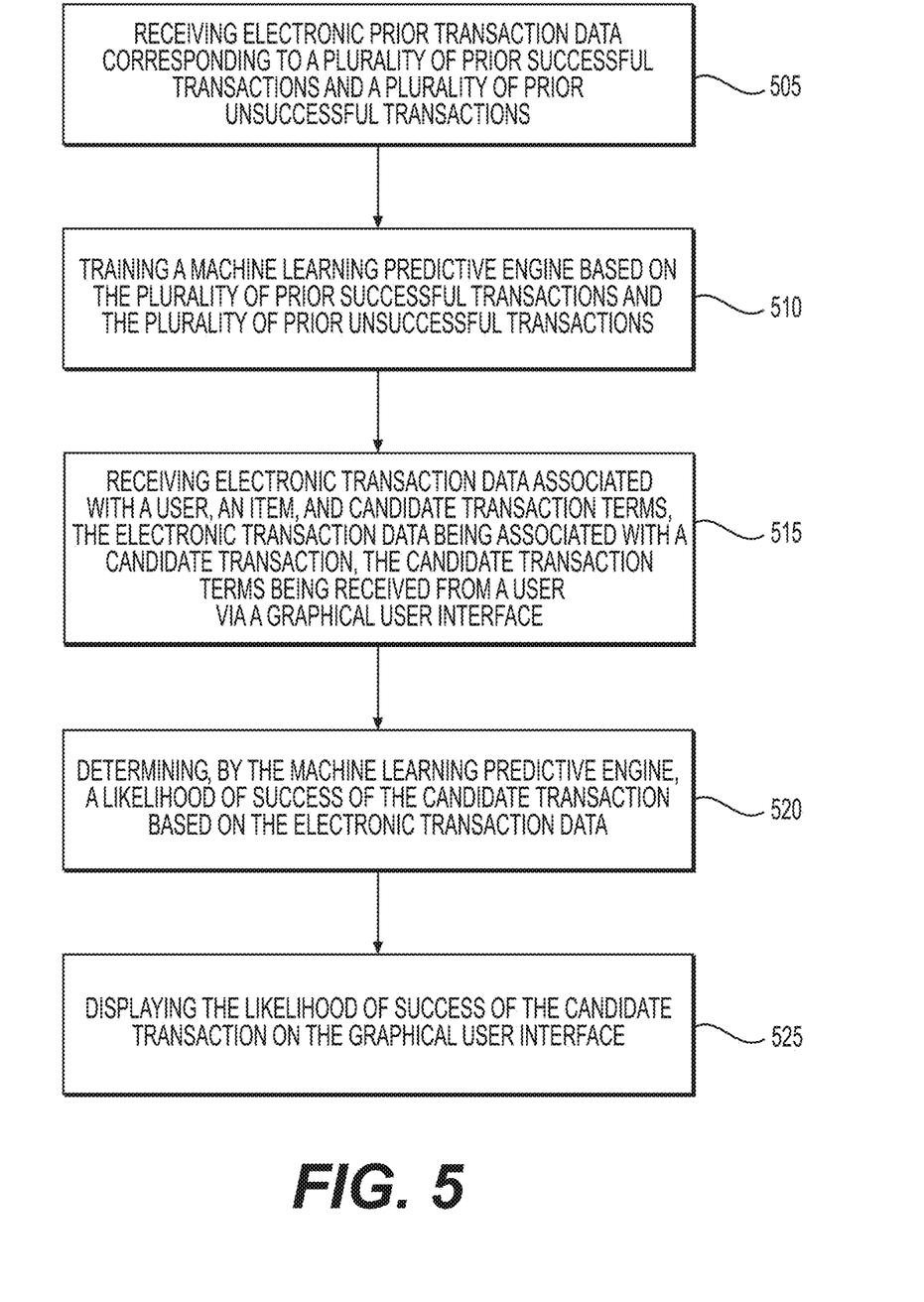
FIG. 5 illustrates a process for forecasting the outcome of candidate transactions, according to one or more embodiments.

FIG. 5 illustrates a process for forecasting the outcome of candidate transactions, according to one or more embodiments. At step 505, electronic prior transaction data may be received corresponding to a plurality of prior successful transactions and a plurality of prior unsuccessful transactions. At step 510, a machine learning predictive engine may be trained based on the plurality of prior successful transactions and the plurality of prior unsuccessful transactions. At step 515, electronic transaction data may be received from a user via a graphical user interface associated with the user, an item, and candidate transaction terms, the electronic transaction data associated with a candidate transaction. At step 520, a likelihood of success of the candidate transaction may be determined by the machine learning predictive engine based on the electronic transaction data. At step 525, the likelihood of success of the candidate transaction may be displayed on the graphical user interface.

Figure 6:
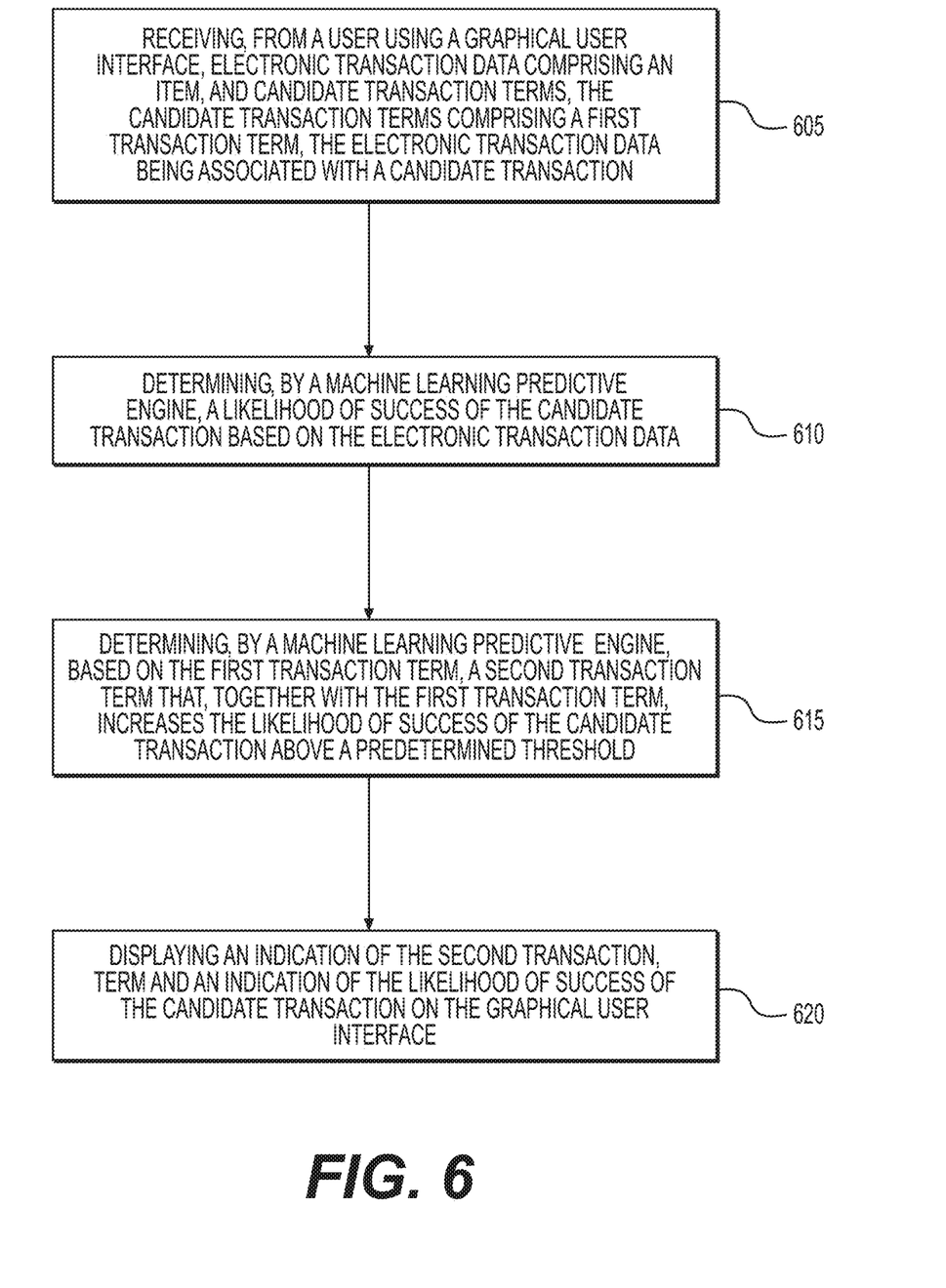
FIG. 6 illustrates a process for forecasting the outcome of candidate transactions, according to one or more embodiments.

FIG. 6 illustrates a process for forecasting the outcome of candidate transactions, according to one or more embodiments. At step 605, electronic transaction data and candidate transaction terms may be received from a user using a graphical user interface, the electronic transaction data comprising an item, the candidate transaction terms comprising a first transaction term, the electronic transaction data being associated with a candidate transaction. At step 610, a likelihood of success of the candidate transaction may be determined, by a machine learning predictive engine, based on the electronic transaction data. At step 615, a second transaction term may be determined, by the machine learning predictive engine, based on the first transaction term, that, together with the first transaction term, increases the likelihood of success of the candidate transaction above a predetermined threshold. At step 620, an indication of the second transaction term and an indication of the likelihood of success of the candidate transaction may be displayed on the graphical user interface.

Figure 7:
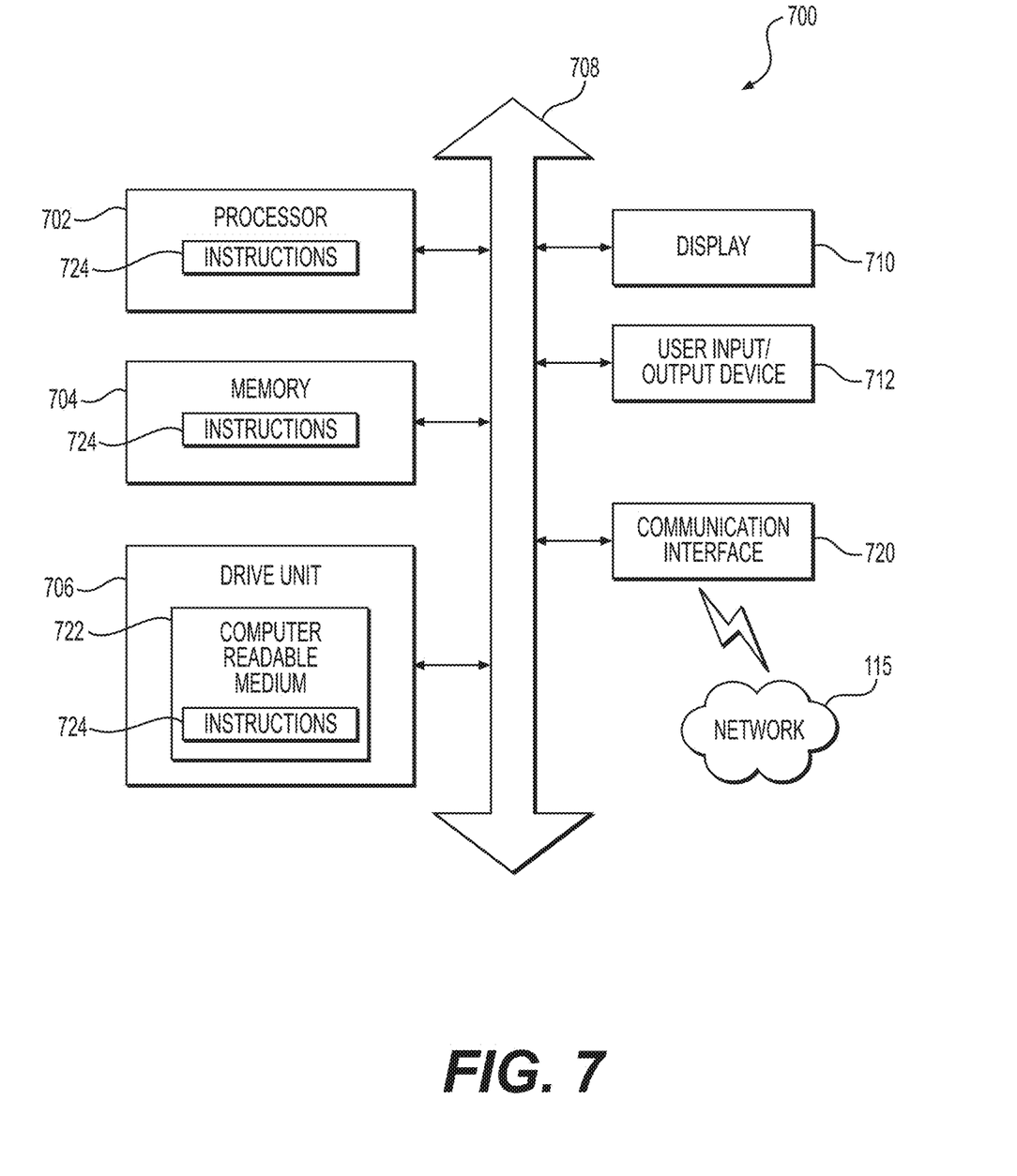
FIG. 7 is a simplified functional block diagram of a computer that may be configured as a device for executing the methods of FIGS. 2, 3, 5, and 6, according to exemplary embodiments of the present disclosure.

FIG. 7 is a simplified functional block diagram of a computer 700 that may be configured as a device for executing the methods of FIGS. 2, 3, 5, and 6, according to exemplary embodiments of the present disclosure. FIG. 7 is a simplified functional block diagram of a computer that may be configured as the lender system 120, predictive system 130, dealer system 110, third party system 125, and/or client system 105 according to exemplary embodiments of the present disclosure. Specifically, in one embodiment, any of the user devices, servers, etc., discussed herein may be an assembly of hardware 700 including, for example, a data communication interface 720 for packet data communication. The platform also may include a central processing unit ("CPU") 702, in the form of one or more processors, for executing program instructions. The platform may include an internal communication bus 708, and a storage unit 706 (such as ROM, HDD, SDD, etc.) that may store data on a computer readable medium 722, although the system 600 may receive programming and data via network communications. The system 700 may also have a memory 704 (such as RAM) storing instructions 724 for executing techniques presented herein, although the instructions 724 may be stored temporarily or permanently within other modules of system 700 (e.g., processor 702 and/or computer readable medium 722). The system 700 also may include input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2-4, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer system for using a machine-learning predictive engine to predict failures in transaction occurrences, the computer system comprising:
    at least one memory storing instructions; and
    one or more processors configured to execute the instructions to perform operations including:
        receiving electronic transaction data comprising an item and candidate transaction terms, the candidate transaction terms comprising a first transaction term, the electronic transaction data being associated with a candidate transaction involving a plurality of parties;
        determining a first likelihood that all of the parties in the plurality of parties will agree to the candidate transaction terms based on the electronic transaction data by evaluating the candidate transaction terms with the machine-learning predictive engine, wherein the machine-learning predictive engine is configured to:
            represent electronic prior transaction data of each of a plurality of prior transactions that occurred and each of a plurality of prior candidate transactions that did not occur as a respective vector in an n-dimensional space;
            represent the electronic transaction data as a further feature vector;
            perform a clustering operation to determine distances between the further feature vector and each of a first cluster corresponding to the plurality of prior transactions that occurred and a second cluster corresponding to the plurality of prior transaction that did not occur; and
            determine the first likelihood based on the determined distances;
        displaying an indication of the first likelihood that all of the parties will agree to the candidate transaction terms on a graphical user interface;
        determining whether the first likelihood is below a predetermined threshold;
        in response to determining that the first likelihood is below the predetermined threshold, determining one or more alternate terms of the candidate transaction that increase the first likelihood to a second likelihood that all of the parties will agree to the candidate transaction terms that is above the predetermined threshold, the determining based on identification of a modification to the further feature vector that would move the further feature vector closer to the first cluster; and
        causing the graphical user interface to display the one or more alternative terms.

2. The computer system of claim 1, wherein determining the one or more alternate terms includes evaluating a plurality of candidate alternative terms using the machine-learning predictive engine to identify the one or more alternate terms that result in the second likelihood.

3. The computer system of claim 1, wherein determining the one or more alternate terms includes using the machine-learning predictive engine with the electronic transaction data to identify the one or more alternate terms.

4. The computer system of claim 1, wherein the operations further include:
   determining a respective effect on the first likelihood associated with one or more transaction term in the candidate transaction terms; and
   causing the graphical user interface to display a first indicator of the first effect.

5. The computer system of claim 1, wherein:
   the electronic transaction data comprises a plurality of historical candidate transaction terms proposed by the user; and
   the operations further include determining, by the machine-learning predictive engine, a range of acceptable candidate transaction terms based on values associated with the historical candidate transaction terms, wherein the machine-learning predictive engine is configured to limit the determining of the one or more alternate terms based on the determined range.

6. The computer system of claim 1, wherein the predictive engine is further configured to determine a respective weight for each of the candidate transaction terms indicative of a respective contribution to the likelihood that all parties in the plurality of parties will agree to the candidate transaction terms.

7. The computer system of claim 1, wherein the operations further include:
   determining whether the likelihood that all parties in the plurality of parties will agree to the candidate transaction terms is below a second predetermined threshold;
   in response to determining that the likelihood that all parties in the plurality of parties will agree to the candidate transaction terms is below the second predetermined threshold, determining one or more alternate items of the candidate transaction that increase the likelihood that all parties in the plurality of parties will agree to the candidate transaction terms that all of the parties will agree to the candidate transaction terms above the second predetermined threshold; and
   causing the graphical interface to display the one or more alternate items of the candidate transaction.

8. The computer system of claim 1, wherein:
   the one or more alternate terms includes a plurality of groups of alternate terms;
   the graphical interface is configured to display each group of alternate terms as a separate selectable package of transaction terms.

9. The computer system of claim 8, wherein the operations further include:
   in response to receiving a selection of a package of transaction terms:
      updating the machine-learning predictive engine based on the selection;
      determining a further plurality of groups of alternate terms; and
      causing the graphical interface to display each further group of alternate terms as a separate selectable package of transaction terms.

* * * * *